United States Patent [19]

Shutterly

[11] Patent Number: 4,662,715

[45] Date of Patent: May 5, 1987

[54] FIBER OPTIC NETWORK WITH REDUCED COUPLING LOSSES

[75] Inventor: Harold B. Shutterly, Edgewood Boro, Pa.

[73] Assignee: Westinghouse Electric Corp., Pittsburgh, Pa.

[21] Appl. No.: 695,039

[22] Filed: Jan. 25, 1985

[51] Int. Cl.[4] .............................................. G02B 6/28
[52] U.S. Cl. ........................... 350/96.16; 350/96.19; 370/3; 455/606; 455/611; 455/612
[58] Field of Search ............... 350/96.15, 96.16, 96.18, 350/96.19; 370/1, 3; 455/602, 606, 608, 610, 611, 612, 613

[56] References Cited

U.S. PATENT DOCUMENTS

| | | | |
|---|---|---|---|
| 4,143,941 | 3/1979 | Soref | 350/96.16 |
| 4,182,544 | 1/1980 | McMahon | 350/96.16 |
| 4,198,117 | 4/1980 | Kobayashi | 350/96.19 |
| 4,232,385 | 11/1980 | Hara et al. | 370/3 |
| 4,234,970 | 11/1980 | Beasley et al. | 350/96.16 X |
| 4,252,404 | 2/1981 | DiVita | 350/96.16 |
| 4,267,590 | 5/1981 | Bosotti | 370/3 |
| 4,317,614 | 3/1982 | Palmer | 350/96.16 |
| 4,341,438 | 7/1982 | Seki et al. | 350/96.16 |
| 4,366,565 | 12/1982 | Herskowitz | 370/1 |
| 4,427,895 | 1/1984 | Eng | 250/551 |
| 4,441,181 | 4/1984 | Winzer et al. | 370/3 |
| 4,449,782 | 5/1984 | Korth | 350/96.16 |
| 4,551,829 | 11/1985 | Dragoo et al. | 370/3 |

OTHER PUBLICATIONS

Aoyama et al., "Optical Demultiplexer for a Wavelength Division...," *Applied Optics*, vol. 18, No. 8, Apr. 1979, pp. 1253-1258.

*Primary Examiner*—John Lee
*Attorney, Agent, or Firm*—Daniel C. Abeles

[57] ABSTRACT

In order to avoid coupling losses, a fiber optic network employs wavelength sensitive devices to couple signals to a bus and split signals from the bus. A terminal device connected to the bus has an optical transmitter which produces signals at a wavelength that is different from the wavelengths employed in optical transmitters of other terminal devices connected to the bus. Furthermore the light is modulated to obtain a frequency channel identifying one or more terminal devices which are to receive messages from the bus. The bus is connected to a repeater which translates between wavelength and frequency channel. Frequency channels may be obtained by amplitude modulating or frequency modulating the light.

16 Claims, 15 Drawing Figures

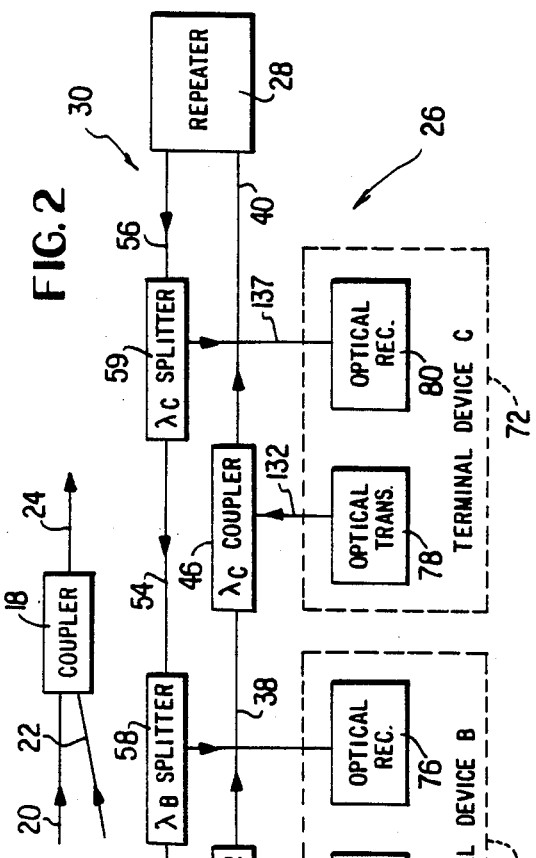
FIG. 1A (PRIOR ART)
FIG. 1B (PRIOR ART)
FIG. 2
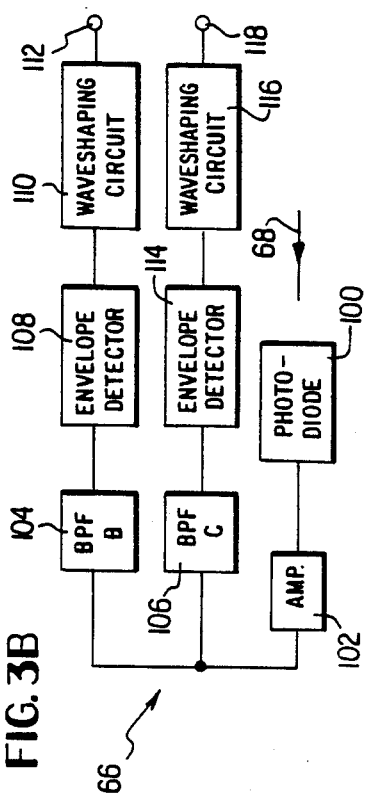
FIG. 3B
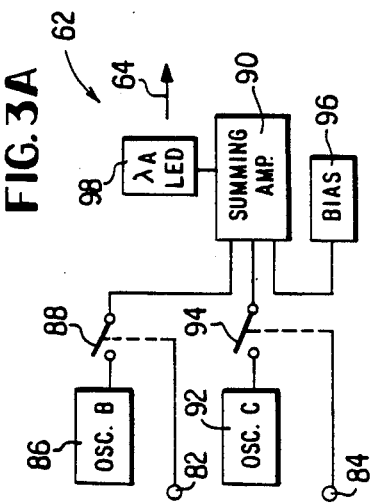
FIG. 3A FIG. 5A
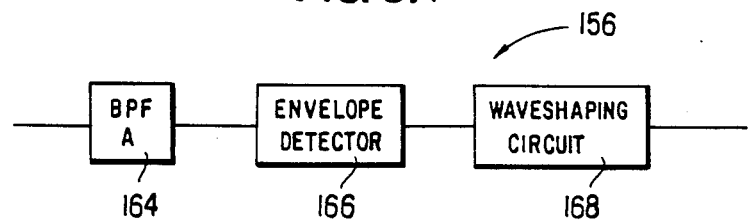
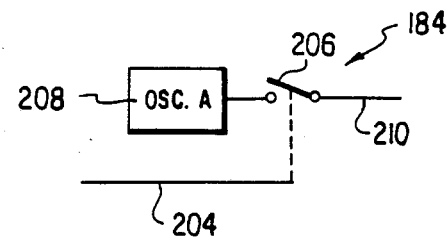
FIG. 5B
FIG. 7
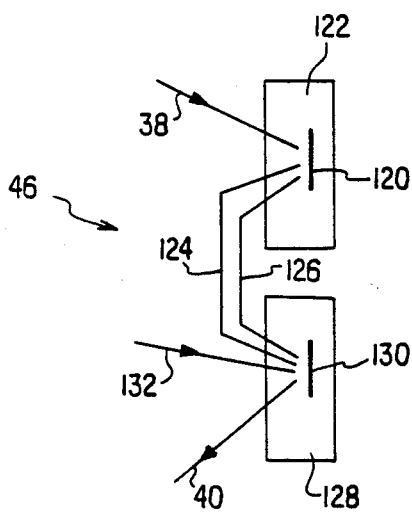
FIG. 8A
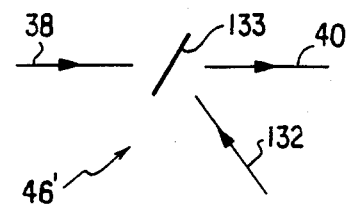
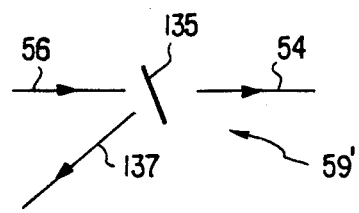
FIG. 8B

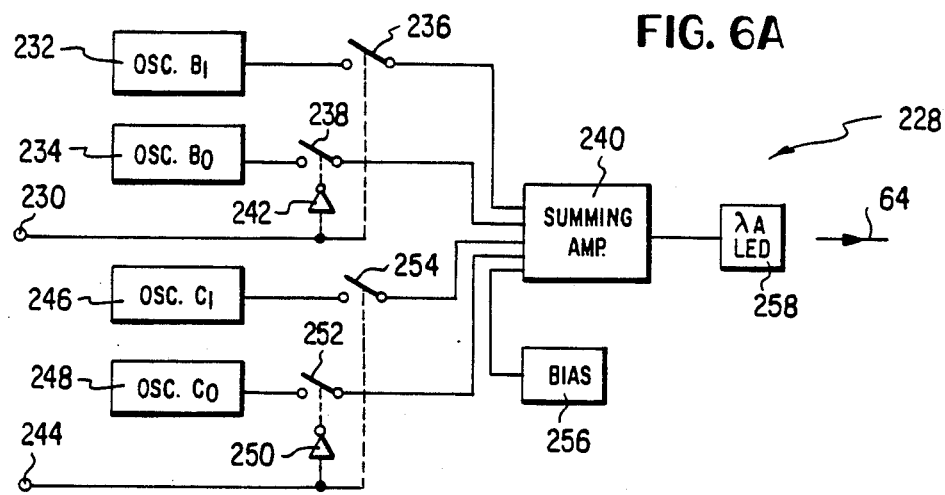
FIG. 6A
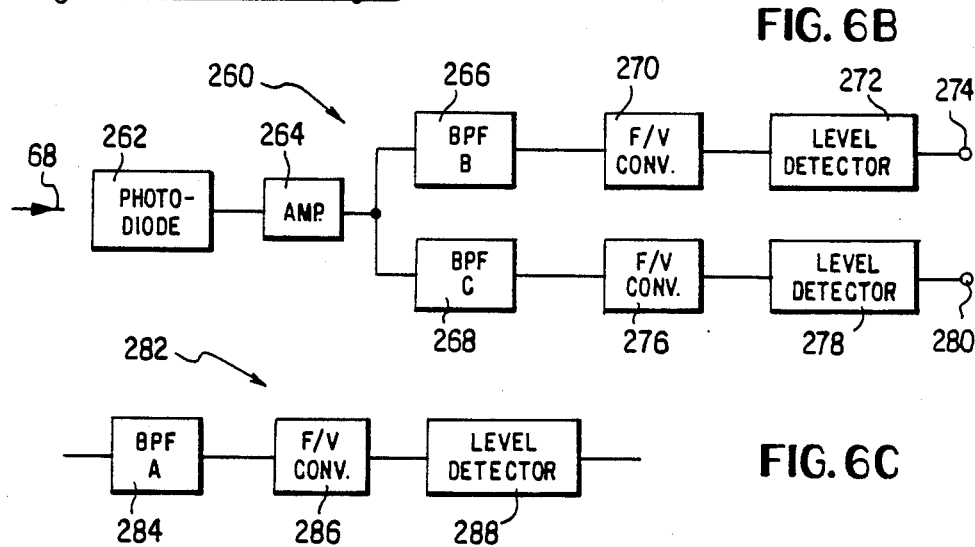
FIG. 6B
FIG. 6C
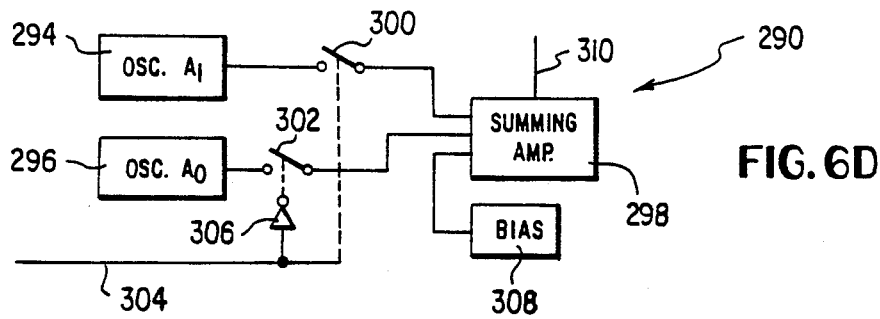
FIG. 6D

FIBER OPTIC NETWORK WITH REDUCED COUPLING LOSSES

BACKGROUND OF THE INVENTION

The present invention is directed to a fiber optic network having reduced coupling losses, and more particularly to a fiber optic network wherein wavelength multiplexing and demultiplexing are employed to reduce optical losses.

Continuing improvements in the transmission quality of optical fibers, and in particular increased bandwidth and reduced attenuation rates, have made optical fiber communication networks an increasingly attractive alternative to networks which employ conductors as the transmission medium. In order to communicate optically, an electrical signal developed within a transmitting terminal device, such as, for example, a telephone, computer, or numerically controlled machine tool, is delivered to an optical transmitter within the terminal device. The optical transmitter uses the electrical signal to modulate light from a source such as an LED or laser. The modulated light is then transmitted via an optical fiber to an optical receiver within a receiving terminal device. The optical receiver includes an optical detector, such as a photodiode, which reconverts the modulated optical signal to an electrical signal. Thus the optical transmitters and receivers within the terminal devices and the optical fibers connecting them effectively replace conductors which might otherwise have been used. Optical communication networks are particularly useful for transmitting digital data in serial form.

Various devices are known for splicing optical fibers or otherwise manipulating optical signals. For example, a transmissive fiber optic star is a passive coupling device used to interconnect a number of terminal devices in a network. In such a network provisions must be made to prevent signals emitted by the optical transmitters of different terminal devices from interfering with each other. Such interference can be avoided by several sophisticated digital communication techniques which have been developed in the electrical communication art, and which can be implemented by circuitry within the terminal devices. In the "token passing" network control system, for example, a terminal having access to the network transmits any message it may have and then "passes the token" by emitting a code identifying the next terminal device entitled to access for the purpose of transmitting a message. The token is passed through a sequence which includes each terminal device in the network, thereby affording equitable access to every terminal device. In the "collision detection" network control system, on the other hand, each terminal device monitors the network and is allowed to transmit a message when the network is not busy. This occassionally results in a "collision" caused by two or more terminal devices that transmit almost simultaneously. In such a situation, each terminal device aborts its message and tries again after a random delay.

Splitters and couplers, like stars, are devices for optically joining fibers. FIG. 1A illustrates a passive splitter 10, which receives light via incoming fiber 12 and disperses the light to outgoing fibers 14 and 16. Passive coupler 18 in FIG. 1B may simply be a splitter used in reverse. Coupler 18 receives light on incoming fibers 20 and 22 and produces a combined output on fiber 24.

The laws of optical propagation are such that passive splitters and couplers inherently introduce significant optical losses. For example if one unit of optical power enters fiber 12 of splitter 10, the power available at each of output fibers 14 and 16 is only half a unit. Thus, there is a 3 dB loss between input fiber 12 and either output fiber 14 or 16. The same phenomenon occurs in coupler 18. If the optical power applied to each of incoming fibers 20 and 22 is one unit, so that the total optical power delivered to coupler 18 is two units, the output on fiber 24 is only one unit. Here again only half of the power available on each of incoming fibers 20 and 22 appears at the output, so that there is a minimum of a 3 dB loss that is inherent in the device. The power losses which are inherently present in passive splitters and couplers can be avoided by configuring a splitter as a wavelength demultiplexer and by configuring a coupler as a wavelength multiplexer. An optical or wavelength demultiplexer is a device which receives an incoming beam of light at various wavelengths and spatially separates the component wavelengths, so that there is an outgoing beam at each wavelength. An optical multiplexer performs the reverse operation. In an optical multiplexer, spatially separated beams of incoming light at different wavelengths are merged to produce a combined outgoing beam. Optical multiplexers and demultiplexers are commercially available devices, some using diffraction gratings, some using mirrors and filters to combine and separate light by wavelength. The role of mirrors and filters in manipulating light by wavelength is summarized in "International Fiber Optics and Communications Handbook and Buyers Guide," Volume 5, 1983 edition, pages 34–41, published by Information Gatekeepers, Inc. of 167 Corey Road, Brookline, Mass. 02146.

If splitter 10 were based upon wavelength demultiplexing and incoming fiber 12 carried optical signals at two different wavelengths, the signal at one wavelength would be routed to outgoing fiber 14 and the signal at the other wavelength would be routed to outgoing fiber 16. The point of importance here is that the power level of the signal on outgoing fiber 14, for example, would be the same (neglecting minor losses) as the power at that wavelength in fiber 12. Similarly, virtually all of the optical power at the other wavelength would be conveyed from fiber 12 to fiber 16. Thus a wavelength splitter based upon optical demultiplexing would split an incoming signal into different wavelengths without attenuating the power levels of the components. The same would be true of a coupler based upon wavelength multiplexing. If coupler 18 were a wavelength multiplexer and if fiber 20 carried light at a first wavelength and fiber 22 carried light at a second wavelength, the combined output on fiber 24 would consist of both wavelengths, with the total optical power being the same as the power received, at different wavelengths, via fibers 20 and 22.

In the remainder of this application the terms "splitter" and "coupler" will refer to devices which separate or combine light by wavelength, and avoid the inherent loss associated with broadband passive splitters and couplers.

SUMMARY OF THE INVENTION

Accordingly, one object of the present invention is to provide a fiber optic network wherein optical power losses are minimized by using wavelength multiplexers and demultiplexers to interconnect terminal devices over a common transmission bus.

Another object of the present invention is to provide an optical network wherein all of the terminal devices continuously have access to the network, so that a network control system such as token passing or collision detection is unnecessary.

Another object of the present invention is to provide a fiber optic network wherein a different optical wavelength is employed by each terminal device, and a combination of wavelength multiplexing and frequency multiplexing is used to achieve independent communication channels between all of the terminal devices. Moreover broadcast messages to a plurality of terminal devices can be transmitted simultaneously.

These and other objects can be attained by providing an optical bus which is connected to the optical transmitters and receivers of the terminal devices by wavelength multiplexers and demultiplexers serving as splitters and couplers. The optical transmitters of the terminal devices transmit on different optical wavelengths, the light at a given wavelength being modulated to provide different frequency channels. The frequency channel for a message is selected in accordance with the terminal device that is the destination of a message. In the repeater, the channel frequency and optical wavelengths are interchanged.

BRIEF DESCRIPTION OF THE DRAWINGS

FIGS. 1A and 1B schematically illustrate a passive splitter and passive coupler, respectively, and are presented for purposes of illustrating optical power losses that can be avoided by optical multiplexers and demultiplexers;

FIG. 2 is a block diagram illustrating the fiber optic network of the present invention;

FIG. 3A is a schematic block diagram illustrating an example of an optical transmitter of a terminal device in FIG. 2 when the frequency channels are obtained by amplitude modulation;

FIG. 3B is a schematic block diagram of an optical receiver of a terminal device in FIG. 2 when the frequency channels are obtained by amplitude modulation;

FIG. 5A is a schematic block diagram of a frequency channel receiver portion in FIG. 4 when an amplitude modulation is employed;

FIG. 5B is a schematic block diagram of a frequency channel transmitter portion in FIG. 4 when amplitude modulation is employed.

FIG. 6A is a schematic block diagram of an optical transmitter of a terminal device in FIG. 2 when frequency modulation is employed to obtain the frequency channels;

FIG. 6B is a schematic block diagram of an optical receiver of a terminal device when frequency modulation is employed to obtain the frequency channels;

FIG. 6C is a schematic block diagram of a frequency channel receiver portion in FIG. 4 when frequency modulation is employed to obtain the frequency channels;

FIG. 6D is a schematic block diagram of a frequency channel transmitter portion in FIG. 4 when frequency modulation is employed to obtain the frequency channels;

FIG. 7 schematically illustrates the combination of a diffraction grating wavelength demultiplexer and a diffraction grating wavelength multiplexer to provide a wavelength coupler of FIG. 2; and FIG. 8A and 8B schematically illustrate the use of interference filters to provide wavelength couplers and splitters of FIG. 2.

DESCRIPTION OF THE PREFERRED EMBODIMENTS

Figure 4:
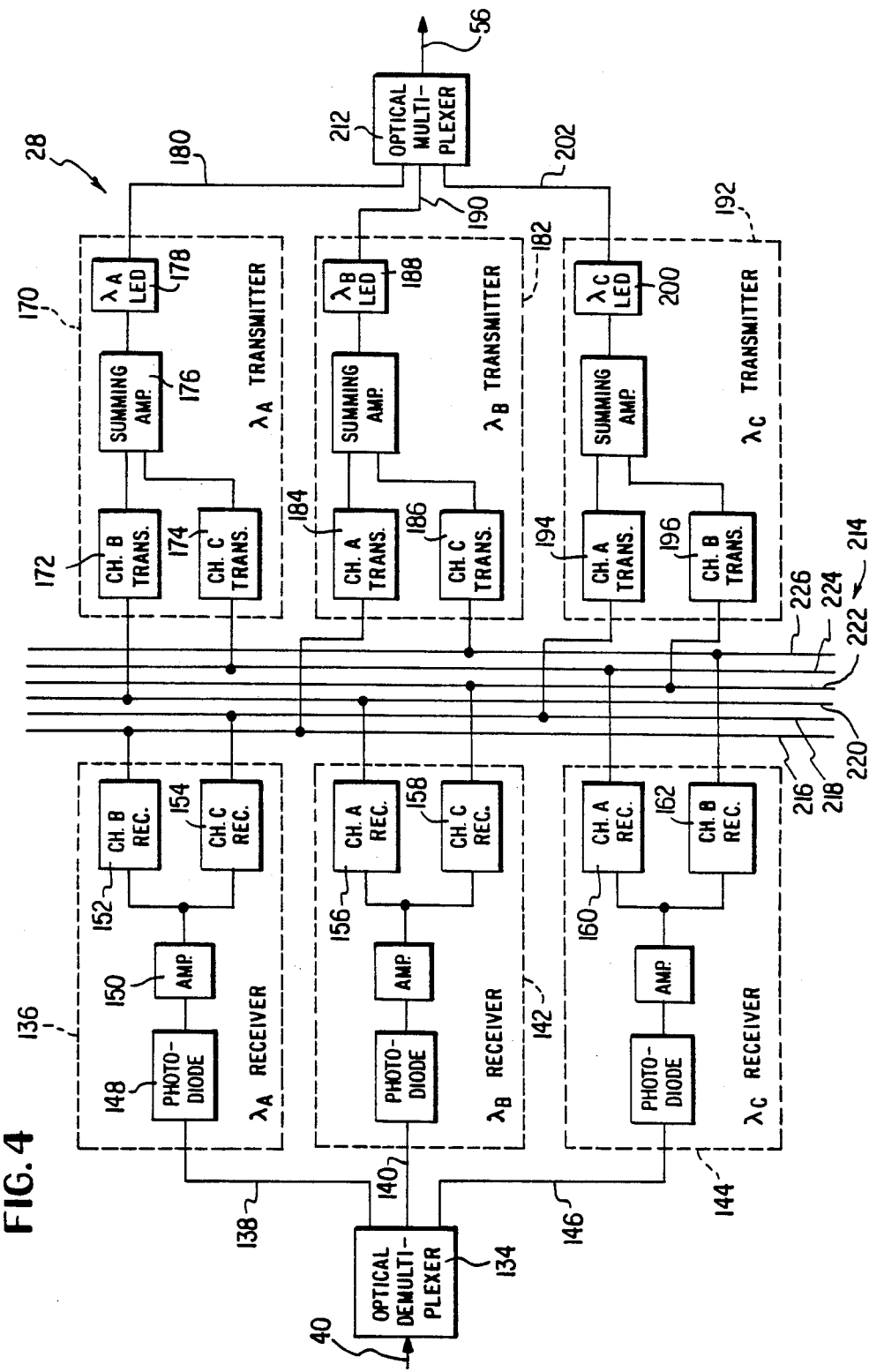
FIG. 4 is a schematic block diagram of the repeater of FIG. 2.

Referring to FIG. 2, network 26 of the present invention includes a repeater 28 and a bus 30 connected thereto. Bus 30 has an incoming transmission line 32 which includes fibers 34, 36, 38, and 40, along with wavelength couplers 42, 44, and 46. Outgoing transmission line 48 includes fibers 50, 52, 54, and 56 together with wavelength splitters 57, 58, and 59.

Terminal device 60 has an optical transmitter 62 which receives digital signals in serial form from terminal device 60 and transforms them to corresponding optical signals which are conveyed by fiber 64 to bus 30. Terminal device 60 also includes an optical receiver 66 which is linked to bus 30 by fiber 68 and which transforms optical signals into corresponding electrical signals which are utilized by terminal device 60. In a similar manner terminal devices 70 and 72 are connected by fibers to both incoming transmission line 32 and outgoing transmission line 48. Terminal device 70 includes an optical transmitter 74 and an optical receiver 76, while terminal device 72 includes optical transmitter 78 and optical receiver 80. Although only three terminal devices are illustrated in FIG. 2, fibers 34 and 50 have been included to indicate that additional terminal devices could be connected. Moreover if terminal device 60 were indeed the last terminal device on bus 30, coupler 42 and splitter 57 could be omitted.

With continuing reference to FIG. 2, optical signals from the terminal devices travel from left to right on transmission line 32 and, after regeneration and translation by repeater 28, as will be described, travel from right to left on transmission line 48.

In the drawing terminal device 60 has been labeled "A," since optical transmitter 62 therein transmits a wavelength $\lambda_A$. Similarily, optical transmitter 74 of terminal device 70 transmits at wavelength $\lambda_B$, and optical transmitter 78 of terminal device 72 transmits at wavelength $\lambda_C$. It will be apparent that coupler 42 serves to add light at wavelength $\lambda_A$ to any light that might already be present on transmission line 32, so that fiber 36 includes light at wavelength $\lambda_A$ along with previous wavelengths. Such operation has been indicated in FIG. 2 by designating coupler 42 as a "$\lambda_A$" coupler. In a similar manner coupler 44 adds light at wavelength $\lambda_B$ to whatever wavelengths might previously have been present, and coupler 46 adds light at wavelength $\lambda_C$. Fiber 40 thus conveys light at wavelengths $\lambda_A$, $\lambda_B$, and $\lambda_C$, etc. On the return leg from repeater 28, splitter 59 removes the $\lambda_C$ component and delivers it to optical receiver 80. Splitter 58 removes the $\lambda_B$ component and splitter 57 removes the $\lambda_A$ component.

In network 26, each of optical transmitters 62, 74, and 78 modulates the light at its respective wavelength with a frequency multiplexed electrical signal to obtain different frequency channels. Either amplitude or frequency modulation can be employed for this purpose. Hereafter it will be assumed that only the three terminal devices 60, 70, and 72 are connected to bus 30, and FIG. 3A illustrates an example of amplitude modulation to obtain different frequency channels when such three terminal devices are present.

In FIG. 3A, optical transmitter 62 of terminal device 60 has electrical input terminals 82 and 84 for receiving digital signals in serial form from terminal device 60. As will become apparent, a signal applied to terminal 82 is used when a message is sent to terminal device 70, and a signal is applied to terminal 84 when a message is sent to terminal device 72. Transmitter 62 includes an oscillator 86 having a frequency "B," which indicates that terminal device 70 is the intended recipient of the message. Electrical switch 88 closes when a "one" appears at terminal 82, thereby providing a signal of frequency B to an input of summing amplifier 90. The frequency "C" oscillator 92, which is used for messages to terminal device 72, is connected to summing amplifier 90 via electrical switch 94. Amplifier 90 is biased by bias source 96 so that the electrical output to LED 98 remains nonnegative regardless of whether oscillator 86, oscillator 92, or both of them are switched to the inputs of amplifier 90. For example, if each oscillator had a peak to peak voltage of 1 volt, so that the maximum negative excursion of both oscillators might reach −1 volt, the voltage of bias source 96 would be +1 volt. LED 98 emits light of wavelength $\lambda_A$ to the end of fiber 64. Summing amplifier 90 is turned off, by circuitry not illustrated, when neither terminal 82 nor terminal 84 receives signals from terminal device 60.

It would be useful at this point to also examine an example of an optical receiver when amplitude modulation is employed to obtain the frequency channels, again assuming the presence of only three terminal devices. In FIG. 3B, light exiting the end of fiber 68 impinges upon an optical detector such as photodiode 100, which converts a light signal to a corresponding electrical signal. The signal is amplified by amplifier 102 and delivered to bandpass filters 104 and 106. Bandpass filter 104 is tuned to frequency B. As will be described subsequently, this leg of the circuit is used to receive messages which originate in terminal device 70. Envelope detector 108 determines whether a signal at frequency B is present, and waveshaping circuit 110, such as a Schmidt trigger or comparator, imparts sharp leading and trailing transitions to the signal. The output of circuit 110 is supplied to electrical output terminal 112, which provides a digital signal in serial form to terminal device 60. Bandpass filter 106 is tuned to frequency C, and is followed by envelope detector 114, waveshaping circuit 116, and electrical output terminal 118.

It will be noted that transmitter 62 of terminal device 60 includes an oscillator for each of the terminal devices 70 and 72, and that the optical receiver 66 has a bandpass filter tuned to each of the same frequency channels. Thus terminal device 60 is provided with a frequency channel corresponding to each of the remaining terminal devices. If additional terminal devices were connected to bus 26, additional oscillators would be needed in transmitter 62 and additional bandpass filters (in series with envelope detectors and waveshaping circuits) would be needed in receiver 66. For the three terminal devices illustrated, transmitter 74 would be the same as transmitter 62 except that oscillator 86 would have the A frequency and LED 98 would emit light at the $\lambda_B$ wavelength. Transmitter 78 would also be the same as transmitter 62 except that oscillator 86 would have the A frequency, oscillator 92 would have the B frequency, and LED 98 would emit light at the $\lambda_C$ wavelength. The circuitry of optical receiver 76 would be the same as that of receiver 66, except that filter 104 would be tuned to the A frequency. The circuitry of optical receiver 80 would also be the same, except that filter 104 would be tuned to the A frequency and filter 106 would be tuned to the B frequency.

Returning to FIG. 2, a brief summary is appropriate at this point. Terminal device 60 transmits at wavelength $\lambda_A$. If a message were destined for terminal device B, the light at wavelength A would be modulated to provide a frequency channel corresponding to terminal device B. As will be described later, repeater 28 transforms the wavelength and frequency; that is, an incoming signal consisting of light at wavelength $\lambda_A$ which has been amplitude modulated at a frequency B would be transformed to light at wavelength $\lambda_B$ which is amplitude modulated at frequency A. This transformed signal would be split out by splitter 58 and delivered to optical receiver 76 of terminal device 70, whereupon it would be converted to an electrical signal present at terminal 112. Thus each terminal device delivers messages to the electrical input terminals of its optical transmitter depending upon the destination of the message, and receives messages at the electrical output terminals of its optical receiver depending upon the source of the message. More than one message can be sent or received at once over network 26.

It will be noted that coupler 46, for example, receives light at wavelengths $\lambda_A$ and $\lambda_B$, and adds light at wavelength $\lambda_C$. This can be accomplished by the structure illustrated in FIG. 7, which receives light at wavelengths $\lambda_A$ and $\lambda_B$ via fiber 38. This incoming light is exposed to a reflection-type diffraction grating 120 in optical demultiplexer 122. Grating 120 separates the incoming light into its component wavelengths by reflecting the light at each wavelength at a different angle. Light at the $\lambda_A$ wavelength enters the end of fiber 124, and light at the $\lambda_B$ wavelength enters the end of fiber 126. Fibers 124 and 126 convey the light to optical multiplexer 128, which includes a reflection-type diffraction grating 130. Multiplexer 128 is essentially a demultiplexer in reverse, and is arranged so that light of different wavelengths impinging upon grating 130 at different angles is reflected in the same direction. Accordingly, light exiting the ends of fibers 124 and 126 is reflected into the end of fiber 40, along with light at wavelength $\lambda_C$ from fiber 132, fiber 132 being connected to optical transmitter 78. Splitter 59, for example, could be made simply by reversing the input and output fibers of coupler 46. With the three terminal devices 60, 70, and 72 illustrated in FIG. 2, only a wavelength multiplexer is needed for coupler 44, and only a wavelength demultiplexer is needed for splitter 58. As has been previously discussed, fiber 52 could be directly connected to receiver 66 and fiber 36 could be directly connected to transmitter 62 if further terminal devices were not present. If additional terminal devices are indeed connected to bus 30, it will be apparent that the scheme set forth in FIG. 7 could be expanded appropriately to provide the necessary wavelength splitters and couplers.

If the wavelengths employed by optical transmitters 62, 74, and 78 are selected so that they have an ordered ascending or decending relationship, such as $\lambda_A < \lambda_B < \lambda_C$, then wavelength splitters and couplers employing interference filters may advantageously be used in network 26. A low pass interference filter, for example, transmits light below a cutoff wavelength and reflects higher wavelengths. This property is exploited by the $\lambda_C$ coupler 46' illustrated in FIG. 8A, which may be used in lieu of the coupler 46 of FIG. 7. In FIG. 8A, light at wavelengths $\lambda_A$ and $\lambda_B$ exits the end of fiber 38, passes through interference filter 133, which has a cutoff wavelength between $\lambda_B$ and $\lambda_C$, and enters the end of fiber 40. Filter 133 is angled with respect to fiber 132 so that light at the $\lambda_C$ wavelength is reflected into the end of fiber 40. Lenses (not illustrated) may of course be used to focus the light in order to avoid losses, and mirrors (not illustrated) may be used to achieve a convenient configuration. It will also be apparent that a wavelength coupler could employ a high pass filter.

Structure similar to that of FIG. 8A is employed in FIG. 8B for $\lambda_C$ splitter 59', except that the filter angle is reversed. In FIG. 8B, light at wavelengths $\lambda_A$, $\lambda_B$, and $\lambda_C$ exits the end of fiber 56 and impinges on interference filter 135. Light at wavelengths $\lambda_A$ and $\lambda_B$ passes to fiber 54, while light at wavelength $\lambda_C$ is reflected to fiber 137 for transmission to terminal device 72 (FIG. 2).

Interference filters are particularly useful for wavelength splitters and couplers when the optical sources in network 26 are LEDs, which tend to have relatively broad spectral outputs. Splitters and couplers based upon diffraction gratings require narrow band light sources, such as laser diodes, for best performance. Although the various optical emitters identified herein are described as LEDs, it will be apparent that laser diodes could also be used.

Turning now to FIG. 4, the circuitry of repeater 28 will now be described. Again it will be assumed that only three terminal devices 60, 70, and 72 are connected to bus 30, that the optical wavelengths employed are $\lambda_A$, $\lambda_B$, and $\lambda_C$, and that the frequency channels occur at frequencies A, B, and C.

In FIG. 4, optical demultiplexer 134 separates incoming light from fiber 40 into wavelength $\lambda_A$, which is conveyed to $\lambda_A$ receiver section 136 by fiber 138, wavelength $\lambda_B$, which is conveyed by fiber 140 to $\lambda_B$ receiver section 142, and wavelength $\lambda_C$, which is conveyed to $\lambda_C$ receiver section 144 by fiber 146. In $\lambda_A$ receiver section 136, light exiting the end of fiber 138 impinges on an optical detector such as photodiode 148. The resulting electrical signal is amplified by amplifier 150 and delivered to channel B receiver portion 152 and channel C receiver portion 154. The output of channel B receiver portion 152, for example, corresponds to the electrical baseband signal supplied to terminal 82 (FIG. 3A) If terminal device 60 (FIG. 2) transmits a message to terminal device 70. Receiver sections 142 and 144 are the same as receiver section 136 except that receiver section 142 includes channel A receiver portion 156 and channel C receiver portion 158. Receiver section 144 is also the same, except that it includes channel A receiver portion 160 and channel B receiver portion 162. For frequency channels that are amplitude modulated, a channel A receiver portion such as portion 156 could be provided as is illustrated in FIG. 5A, wherein a bandpass filter 164 is tuned to the A frequency. The tuning would of course be different for a channel B receiver portion (e.g., 152) or a channel C receiver portion (e.g., 154). The input of filter 164 is connected to the amplifier of the receiver section (e.g., 150) and the output is connected to an envelope detector 166. The output of the receiver portion is provided by waveshaping circuit 168.

With continuing reference to FIG. 4, $\lambda_A$ transmitter section 170 includes a channel B transmitter portion 172 and a channel C transmitter portion 174. The outputs of portions 172 and 174 are provided to summing amplifier 176, which is biased to always avoid a nonnegative output. The output is provided to LED 178, which emits light at wavelength $\lambda_A$ to fiber 180. Amplifier 176 is turned off, by circuitry not illustrated, when neither transmitter portion 172 nor 174 is transmitting a message. $\lambda_B$ transmitter section 182 is the same as transmitter section 170, except that transmitter section 172 includes channel A transmitter portion 184 and channel C transmitter portion 186, and except that LED 188 emits light at the $\lambda_B$ wavelength to fiber 190. $\lambda_C$ transmitter section 192 is also the same as transmitter section 170, except that transmitter section 192 includes a channel A transmitter portion 194, a channel B transmitter portion 196, and an LED 200 which emits light at the $\lambda_C$ wavelength to fiber 202.

FIG. 5B illustrates an example of a channel A transmitter portion (e.g., 184) when the frequency channels are amplitude modulated. The input signal applied to conductor 204 operates electronic switch 206, thereby connecting or disconnecting oscillator 208 to output conductor 210. Oscillator 208 is tuned to the A frequency. The tuning would be different, of course, for a channel B transmitter portion (e.g. 172) or a channel C transmitter portion (e.g. 174).

Optical multiplexer 212 receives the light from fibers 180, 190, and 202, and provides an output on fiber 56 combining the various signals at the various wavelengths.

Receiver sections 136, 142, and 144 are connected to transmitter sections 170, 182, and 192 via bus 214, which includes conductors 216, 218, 220, 222, 224, and 226. The output of receiver portion 152 is connected to the input of transmitter portion 184 via conductor 216; the output of receiver portion 154 is connected to the input of transmitter portion 194 via conductor 218; the output of receiver portion 156 is connected to the input of transmitter portion 172 via conductor 220; the output of receiver portion 158 is connected to the input of transmitter portin 196 via conductor 222; the output of receiver portion 160 is connected to the input of transmitter portion 174 via conductor 224; and, finally, the output of receiver portion 162 is connected to the input of transmitter portion 186 via conductor 226.

It is useful at this point to observe what such interconnections provide. As was previously discussed, the demultiplexer 134 routes light at the $\lambda_A$ wavelength, for example, to $\lambda_A$ receiver section 136. Signals at the $\lambda_A$ wavelength are emitted by terminal device 60, which might send a message via frequency channel B to terminal device 70 or via frequency channel C to terminal device 72. Thus $\lambda_A$ receiver section 136 processes messages which terminal device 60 might send to the two other terminal devices, 70 and 72, which are connected to bus 30. Channel B receiver portion 152 regenerates the baseband electrical signals for messages destined for terminal device 70, and channel C receiver portion 154 regenerates the baseband signals for messages destined for terminal device 72.

With continuing reference to FIG. 4, the output of receiver portion 152, for example, is provided to the input of transmitter portin 184. Thus a message emitted at the $\lambda_A$ wavelength on frequency channel B (that is, by terminal device 60 to terminal device 70) is transformed by repeater 28 to a message having the same information content, but propagated at the channel B wavelength on frequency channel A. It will be apparent to those skilled in the art that the circuitry of Figure 4 transforms wavelength and frequency channel in this way for all of terminal devices 60, 70, and 72.

Frequency modulation techniques can also be employed to obtain the frequency channels that are used in network 26. FIG. 6A illustrates an example of an FM optical transmitter 228, which could be used in terminal device 60 in lieu of optical transmitter 62. Electrical input terminal 230 receives from terminal device 60 digital signals, in serial form which are destined for transmission over frequency channel B to terminal device 70. Oscillators 232 and 234 provide frequency shift keying, oscillator 232 having a frequency $B_1$ that is slightly higher than the frequency $B_0$ of oscillator 234. Electrical switches 236 and 238 connect oscillators 232 and 234, respectively, to summing amplifier 240. Inverter 242 inverts the baseband signal applied to input terminal 230, so that switch 238 closes when a "0" signal is applied to terminal 230. On the other hand switch 236 closes when a "1" is applied.

Electrical input terminal 244 receives from terminal device 60 digital signals destined for transmission over frequency channel C to terminal device 72. Oscillators 246 and 248 have slightly different output frequencies $C_1$ and $C_0$ to provide frequency shift keying. Inverter 250 closes switch 252 when a "0" appears at terminal 244, while switch 254 closes when a "1" appears. Bias source 256 biases amplifier 240 so that amplifier 240 has a nonnegative output regardless of the combination of input signals from oscillators 232, 234, 246, and 248. The output of amplifier 240 drives LED 258, which emits light at wavelength $\lambda_A$ to the end of fiber 64. Amplifier 240 is turned off, by circuitry not shown, if a message is to be sent to neither terminal device 70 nor 72.

FIG. 6B illustrates an example of an FM optical receiver suitable for use in lieu of receiver 66 in terminal device 60. In FIG. 6B, receiver 260 includes an optical detector such as photodiode 262 which receives light from the end of fiber 68. The output of photodiode 262 is amplified by amplifier 264 and then delivered to bandpass filters 266 and 268. Filter 266, for example, is tuned to the channel B frequency; that is, it passes both frequencies $B_1$ and $B_0$. Frequency-to-voltage converter 270 produces one voltage when frequency $B_1$ is received and a lower voltage when frequency $B_0$ is received. Level detector 272, such as a comparator, imparts sharp leading and trailing edges to the signal before delivering it to electrical output terminal 274 for subsequent use within terminal device 60. Similarily, frequency-to-voltage converter 276, level detector 278, and electrical output terminal 280 follow bandpass filter 268.

FIG. 6C illustrates a channel A receiver portion 282 which can be used in lieu of receiver portion 156 (FIG. 4), for example, when frequency modulation is used to obtain the frequency channels. In FIG. 6C, bandpass filter 284 has an input which receives the output of the amplifier (not numbered) in $\lambda_B$ receiver 142. Filter 284 is tuned to pass frequencies $A_1$ and $A_0$. Frequency-to-voltage converter 286 produces a voltage which depends upon the frequency of the signal passed by filter 284, and level detector 288 produces sharp transitions. The output of detector 288 is connected to conductor 220 of bus 214, again assuming that receiver portion 282 replaces portion 156.

FIG. 6D illustrates a channel A transmitter portion 290 which can be used in lieu of portion 184 (see FIG. 4), for example, when frequency modulation is used to obtain the frequency channels. In FIG. 6D, oscillators 294 and 296 produce slightly different output frequencies $A_1$ and $A_0$, frequency $A_1$ corresponding to a digital "1" and frequency $A_0$ corresponding to a digital "0." Oscillators 294 and 296 are connected to inputs of summing amplifier 298 via switches 300 and 302, which are controlled by a voltage applied to input conductor 304. Assuming that transmitter portion 290 is used to replace portion 184 of FIG. 4, conductor 304 would be connected to conductor 216 of but 214. Inverter 306 closes switch 302 when a digital "0" is applied to conductor 304 and closes switch 300 when a "1" is applied. Bias source 308 biases amplifier 298 so that the output thereof remains nonnegative regardless of the input signal. Output conductor 310 is connected to one input of the summing amplifier (not numbered) of $\lambda_B$ transmitter section 182, again assuming that it is transmitter portion 184 that transmitter portion 290 replaces.

Transmitter 228 and transmitter portion 290 may employ voltage controlled oscillators rather than summing the outputs of individual oscillators, as illustrated in FIGS. 6A and 6D. For example, in FIG. 6D the input of a VCO would be connected to conductor 304, and the output to conductor 310.

Although the operation of network 26 has been described with reference to terminal devices, subnetworks rather than individual terminal devices may be connected to bus 30. The invention would then provide a network affording low-loss communication between subnetworks.

From the foregoing discussion it will be apparent that the network of the present invention avoids power losses by coupling signals to a bus and splitting them from a bus using wavelength multiplexing and demultiplexing devices. Moreover different optical wavelengths and frequency channels are provided to permit communication without the constraints imposed by a network control system such as token passing or collision detection.

It will be understood that the above description of the present invention is susceptible to various modifications, changes, and adaptations, and the same are intended to be comprehended within the meaning and range of equivalents of the appended claims.

What I claim is:

1. A fiber optic network, comprising:
   a plurality of terminal devices, each terminal device having an optical receiver to convert optical messages from other terminal devices into electrical form and having an optical transmitter to convert electrical messages to optical form for transmission to other terminal devices, said optical transmitter including means for emitting light at a wavelength that is different from the wavelengths employed by the optical transmitters of other terminal devices, and means for modulating the light at a frequency corresponding to the terminal device which is to receive the message;
   an optical bus, said bus including a first transmission line having wavelength coupler means for accepting light at different wavelengths from the optical transmitters and a second transmission line having wavelength splitter means for distributing light at different wave-lengths to the optical receivers; and
   repeater means connecting the first and second transmission lines for converting an optical message at a first wavelength and second frequency to an optical message at a second wavelength and first frequency.

2. The network of claim 1, wherein said wavelength coupler means comprises an optical multiplexer.

3. The network of claim 2, wherein said wavelength coupler means additionally comprises an optical demultiplexer optically connected to said multiplexer.

4. The network of claim 1, wherein said wavelength splitter means comprises an optical demultiplexer.

5. The network of claim 4, wherein said wavelength splitter means additionally comprises an optical multiplexer optically connected to said demultiplexer.

6. The network of claim 1, wherein said means for modulating the light comprises means for amplitude modulating the light.

7. The network of claim 1, wherein said means for modulating the light comprises means for frequency modulating the light.

8. The network of claim 1, wherein said repeater means comprises an optical demultiplexer optically connected to said first transmission line, an optical multiplexer optically connected to said second transmission line, receiver means connected to said optical demultiplexer for regenerating optical messages into electrical form, and transmitter means connecting said receiver means and said optical multiplexer for generating optical messages from the messages in electrical form.

9. The network of claim 8, wherein said receiver means comprises a plurality of receiver sections, each receiver section corresponding to a respective terminal device, and optical fibers connecting each receiver section to the optical demultiplexer.

10. The network of claim 9, wherein each receiver section comprises a plurality of channel receiver portion means for responding to electrical signals at different frequencies.

11. The network of claim 10, wherein said channel receiver portion means comprises means for detecting AM signals.

12. The network of claim 10, wherein said channel receiver portion means comprises means for detecting FM signals.

13. The network of claim 10, wherein said transmitter means comprises a plurality of transmitter sections, each transmitter section corresponding to a respective terminal device, and optical fibers connecting each transmitter section to the optical multiplexer.

14. The network of claim 13, wherein each transmitter section comprises a plurality of channel transmitter portion means for emitting electrical signals at different frequencies.

15. The network of claim 14, wherein each channel transmitter portion means comprises means for generating AM signals.

16. The network of claim 15, wherein each transmitter portion means comprises means for generating FM signals.

* * * * *